Jan. 20, 1959 E. G. MILES 2,869,399
DIFFERENTIAL TRANSMISSION
Filed Dec. 11, 1957 2 Sheets-Sheet 1

Inventor
Everett G. Miles
McCanna and Morsbach
Attys

Jan. 20, 1959     E. G. MILES     2,869,399
DIFFERENTIAL TRANSMISSION
Filed Dec. 11, 1957     2 Sheets-Sheet 2
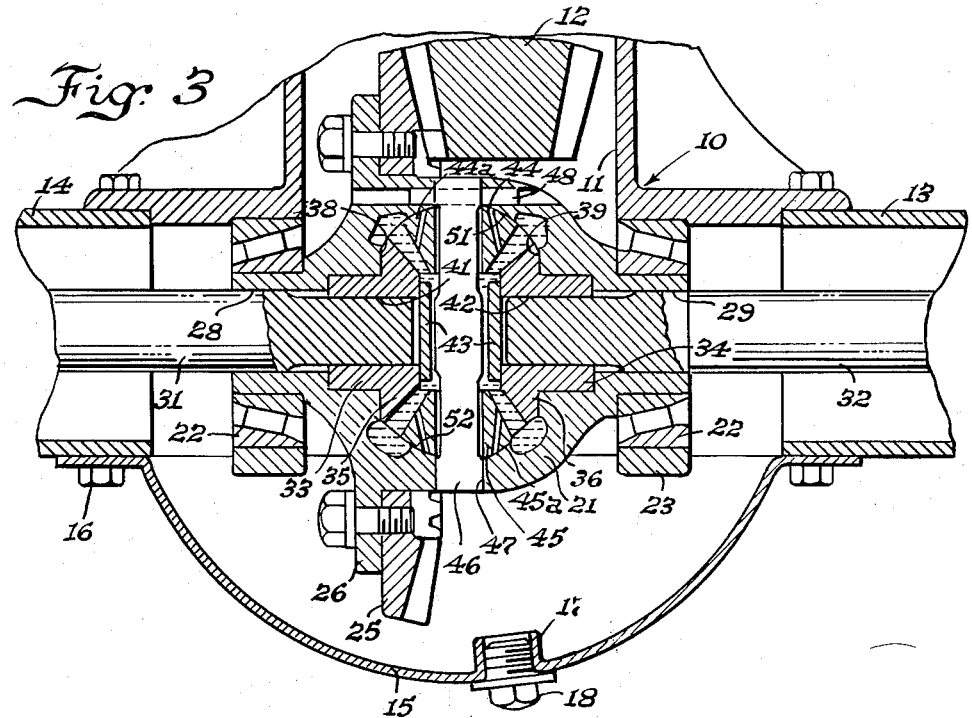
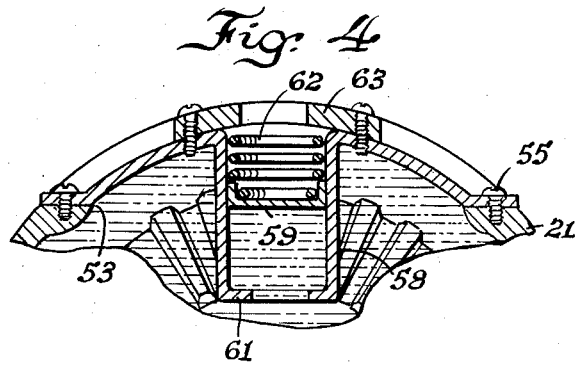
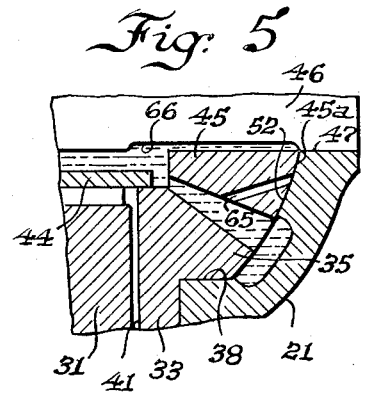
Inventor
Everett G. Miles
McCanna and Morsbach
Attys United States Patent Office 2,869,399
Patented Jan. 20, 1959

2,869,399

DIFFERENTIAL TRANSMISSION

Everett G. Miles, Rockford, Ill.

Application December 11, 1957, Serial No. 702,206

3 Claims. (Cl. 74—711)

This invention relates to differential transmissions and particularly to differential transmissions for use in automotive vehicles and the like.

An important object of this invention is to provide a differential transmission having an improved arrangement for limiting the differential motion between the driven shafts to thereby prevent free spinning of one driven shaft while the other is stationary.

Another object of this invention is to provide a differential transmission, in accordance with the foregoing object, which is of simple and economical construction and which does not require extensive modification in the construction of a conventional transmission to provide a predetermined coupling between the driven shafts for limiting differential motion therebetween.

A more particular object of this invention is to provide a differential transmission including a lubricant containing differential housing and a differential case rotatably supported in the housing and sealed therefrom, which case encloses the differential pinions and side gears and is filled with a highly viscous lubricant for limiting the differential motion between the driven shafts.

A further object of this invention is to provide a differential transmission in accordance with the foregoing object in which the side gears engage the case to form a running seal therewith and means is provided for pressure loading the side gears against the case to prevent ingress of the lubricant from the differential housing into the differential case.

A further object of this invention is to provide a differential transmission in accordance with the foregoing object having an improved means for forcing the highly viscous lubricant in the differential case to the bearing surfaces on the differential pinions in the case to thereby lubricate the latter.

Still another object of this invention is to provide an improved differential transmission having a sealed differential case containing a highly viscous lubricant for limiting the differential motion between the driven shafts and having provision for compensating for expansion and contraction of the lubricant with temperature changes and also for losses of the lubricant in the case due to leakage therefrom.

These, together with various ancillary objects and advantages of this invention, will be more readily appreciated as the same becomes better understood by reference to the following detailed description when taken in connection with the accompanying drawings wherein:

Fig. 3 is a fragmentary sectional view through the differential transmission;

Fig. 4 is an enlarged fragmentary sectional view through the differential case and illustrating the expansion chamber therein, and Fig. 5 is a fragmentary view through the differential case and illustrating the lubrication means for the differential pinions.

Figure 1:
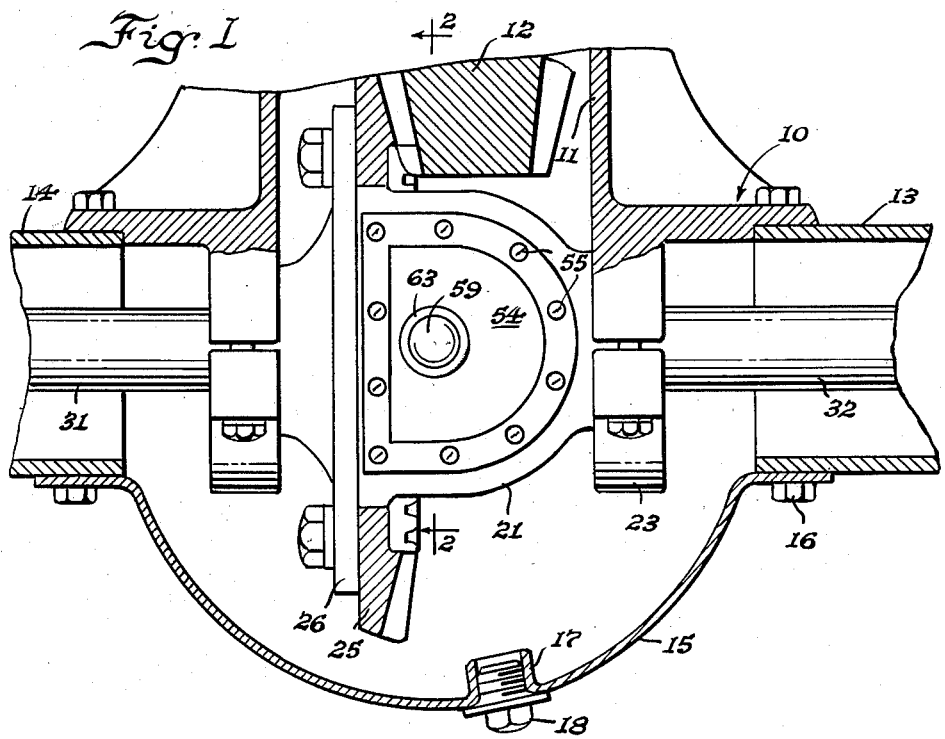
Figure 1 is a fragmentary sectional view through the differential transmission with parts shown in elevation to illustrate details of construction.
Figure 2:
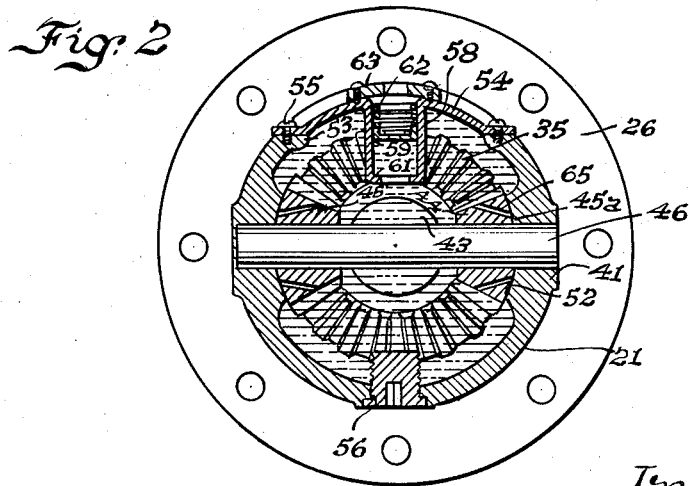
Fig. 2 is a transverse sectional view through the differential case taken on the plane 2—2 of Figure 1.

This is a continuation-in-part of my copending application Serial No. 586,294, filed May 31, 1956, and now abandoned.

The differential transmission of the present invention includes a housing 10 of any suitable construction having an opening 11 at one side for the reception of the drive pinion 12. A pair of axle housings 13 and 14 are secured to the differential housing 10 and extend therefrom at right angles to the opening 11. In the form illustrated, the housing 10 includes a one-piece casting having a cover plate 15 affixed to the open side thereof as by fasteners 16, it being understood that the housing may be otherwise formed if desired. As is conventional, a filler opening 17 is provided in the housing 10 and has a plug 18 therein for closing the opening.

A differential case 21 is rotatably supported at opposite ends thereof in bearings 22 carried by bearing caps 23 on the housing 10. The case 21 has a ring gear 25 affixed thereto, as by bolting to the flange 26 on the case, which ring gear meshes with the drive pinion 12 to rotate the case about its axis in response to rotation of the drive pinion. The case 21 is formed with axially disposed openings 28 and 29 for the reception of the driven shafts 31 and 32, respectively. The openings 28 and 29 are counterbored at the inner ends thereof for the reception of the trunnions 33 and 34 of the opposed differential side gears 35 and 36, respectively. As best shown in Fig. 3, the side gears are rotatably supported in the openings 28 and 29 and abut the radial bearing surfaces 38 and 39 on the inner side of the differential case to form a running seal therewith and prevent leakage of material between the case 21 and the differential housing 10. Means, to be described more fully hereinafter, is provided for pressure loading the side gears against the case to maintain the seal therewith. The side gears 35 and 36 are formed with splined openings 41 and 42 for the reception of the complementarily splined inner ends of the driven shafts 31 and 32 to drivingly interconnect the side gears and the driven shafts, and provision is made for sealing the openings 41 and 42. As shown in Fig. 3, a pair of plates 43 are welded or otherwise rigidly secured to the registering faces of the side gears and extend across the openings therein to seal the latter against the passage of material therethrough. As is apparent, any other suitable means for sealing the openings in the side gears may be provided.

A pair of differential pinions 44 and 45 are rotatably mounted on a differential pin 46 and disposed in meshing engagement with the side gears 35 and 36. The pin 46, as is conventional, is rigidly mounted on the differential case 21 and as shown extends through aligned bores 47 therein and is affixed to the case as by a pin 48. The differential pinions are rotatably mounted on the pin 46 and are formed with semispherical end faces 44a and 45a adapted to engage the complementarily formed bearing surfaces 51 and 52 on the differential case.

In accordance with the present invention, the differential case 21 is constructed to completely enclose the side gears and differential pinions to provide a sealed chamber therein separate from the chamber within the housing. A lubricant which is highly viscous and does not flow readily at normal atmospheric temperatures is provided in the case chamber and completely fills the openings in the same around the side gears and drive pinions to retard relative rotation between the side gears and thus limit the differential motion between the driven shafts. In the embodiment illustrated, the differential case is formed of one piece and provided with an enlarged access opening 53 to permit insertion of the side gears and the differential pinions into the case. The access opening 53 in the case 21 is sealed by a dome-shaped cover plate 54 which is affixed thereto as by fasteners 55 to thereby completely enclose the gears in the case. A filler opening 56 is provided in the case to permit the introduction of highly viscous lubricant therein, and a filler plug 57 is mounted in the opening as by threaded engagement therewith to seal the latter. Conveniently, the filler plug is arranged to extend into the space between the side gears 35 and 36 so as to enable the use of filler plugs of different lengths to displace more or less of the highly viscous lubricant in the case.

In a differential transmission, relative rotation between the differential pinions and the side gears occurs only when the driven shafts 31 and 32 rotate at relatively different speeds. When the driven shafts rotate at the same speed, the side gears rotate in unison with the differential case and the differential pinions remain stationary relative to the side gears. Under these conditions, only the ring gear 25 and drive pinion 12 rotates relative to each other and these gears are lubricated in the conventional manner by low viscosity lubricant such as SAE 80 to SAE 120 oil which at least partially fills the differential housing around the case 21.

When the driven shafts rotate at relatively different speeds, the side gears also rotate at different speeds and the differential pinions which mesh with the side gears rotate relative thereto. Since the highly viscous lubricant completely fills the differential case and the inter-tooth spaces in the differential pinions and side gears, a portion of this lubricant must be displaced from the inter-tooth spaces at one side of each mesh point of a differential pinion and side gear to the other side of the mesh points. This impedes relative rotation between the side gears and differential pinions and thus tends to cause the side gears to rotate at substantially the same speed. Although the ends of the gear teeth on the differential pinions and side gears are open, the highly viscous lubricant does not flow readily therefrom so that a portion of the highly viscous lubricant is entrapped in the inter-tooth spaces in the differential pinions and side gears at the point of meshing engagement. The pressure on this entrapped lubricant builds up to a relatively high value as the gear teeth intermesh, which pressure has one component which extends tangentially of the gears and retards relative rotation therebetween and a second component which extends perpendicular to the gear teeth and produces a separating force on the gears. This last-mentioned component urges the side gears 35 and 36 and the differential pinions 44 and 45 against the respective bearing surfaces therefor on the case to retard rotation between the gears and the case. These forces thus operate to transmit more of the input torque to that driven shaft which is rotating at relatively lower speed than the other driven shaft and tend to cause the driven shafts to rotate in unison. As the differential speed between the driven shafts is increased, the forces also increase to transmit an even greater portion of the input torque to that driven shaft which rotates at the lower speed.

As is apparent, the lubricant used in the case may be any of a wide variety of materials having a relatively high viscosity and sufficient lubricity to prevent excessive wear in the differential case and that finely divided solid materials may be included in the lubricant, if desired. The viscosity of the lubricant in the case can be varied to control the effective coupling between the driven shafts. However, in automotive transmissions it has been found that a lubricant having a viscosity corresponding to N. L. G. I. (National Lubricating Grease Institute) number 2 grease was the minimum viscosity grease which would produce appreciable coupling between the driven shafts and that a lubricant having a viscosity of greater than N. L. G. I. number 3 is preferred. The solid additives in the lubricant, such as graphite, may be selected for their lubricating characteristics, to limit wearing between the thrust faces on the side and differential pinion gears and the differential case. Since the graphite is solid, it retards breakdown of the lubricating film between the side and pinion gears and the differential case due to the axial thrust on these gears. In practice it has been found that the addition of graphite to the grease in the case also slightly reduces the effective coupling between the driven shafts over that obtained with the same grease which did not contain graphite.

In accordance with the present invention provision is made for maintaining the highly viscous lubricant in the differential case under pressure to prevent "channeling" of gears in the differential case and to pressure load the side gears 35 and 36 outwardly against the differential case. Lubricants of the type used in the differential case, viz. greases having a viscosity of the order of number 3 N. L. G. I. and higher, are such that they do not readily flow back into the intertooth spaces of the gears, after having been pressed out of the inter-tooth spaces during meshing of the side and pinion gears. Consequently, there is a marked tendency for gears operating in such a highly viscous lubricant to "channel" or rotate in the mass of grease without the latter flowing into the intertooth spaces. This problem is effectively overcome by applying pressure on the lubricant in the case sufficient to cause the same to flow into the intertooth spaces of the gears, as the gear teeth move away from the mesh point thereof. As previously described, this is essential to proper operation of the device.

Pressurizing the lubricant in the differential case also pressure loads the side gears against the case to maintain a seal therebetween, even when the vehicle is idle. The previously mentioned separating force between the side gears and the differential pinions occurs only when these gears are rotating relative to each other. However, because of the relatively large area on the inner faces of the side gears which are exposed to the above atmospheric pressure on the lubricant in the differential case, the side gears will be urged outwardly at all times against the differential case. This prevents the relatively thin lubricant in the differential housing from entering the case around the side gears and diluting the highly viscous lubricant in the case.

Since the lubricant in the case must completely fill the same in order to obtain proper operation of the differential transmission, an expansion chamber is provided to accommodate the expansion and contraction of the lubricant with temperature changes and to also compensate for leakage from the case. Conveniently, the expansion chamber may be formed on the cover plate 54 and includes an inwardly extending sleeve 58 on the cover plate, which sleeve extends into the space between the side gears 35 and 36. A piston 59 is disposed in the sleeve and a flange 61 is provided at the inner end thereof to prevent movement of the piston out of the sleeve. A compression spring 62 disposed in the sleeve between the piston 59 and a stop 63 carried by the case, to yieldably urge the piston inwardly. When the case is initially filled with lubricant, a portion of the lubricant is displaced into the sleeve and urges the piston outwardly against the bias of spring 62. The spring permits movement of the piston to accommodate expansion and contraction of the lubricant in the differential case and to also compensate for some leakage of lubricant from the case. The spring 62 is made relatively stiff and sufficient to maintain the lubricant in the case at a pressure above atmospheric pressure and sufficient to cause the lubricant in the case to flow rapidly into the intertooth spaces in the side and pinion gears and to also pressure load the side gears against the differential case to prevent leakage thereby.

The highly viscous lubricant in the case does not flow readily through confined spaces and provision is made for forcing some of the lubricant to the bearing surfaces on the differential pinions to lubricate the same. As best shown in Fig. 5, a plurality of lubrication passages 65 are provided in the differential pinions 44 and 45, which passages intersect the inter-tooth spaces on the differential pinions approximately midway between the inner and outer ends thereof. The lubrication passages extend through the differential pinions and open at the spherical end faces 44a and 45a thereof. The lubrication passages 65, preferably open at a point on the semi-spherical faces of the drive pinions which is approximately midway between the radially inner and outer edges of the face so as to force lubricant in both directions between the faces 44a and 45a of the pinions and the mating seats 51 and 52 on the case. Flats 66 are formed on the differential pin 46 and extend throughout the length of the differential pinions to permit a portion of the lubricant which is forced under pressure through the passages 65 to flow therethrough and effect lubrication of the differential pinions. In this manner circulation of the highly viscous lubricant to the bearing surfaces on the differential pinions, is effected.

From the foregoing it is thought that the operation of the differential transmission would be readily understood. During the normal running of the vehicle along a straight path, the driven shafts 31 and 32 are rotated at the same speed. Under these conditions, the side gears 35 and 36 rotate in unison with the differential case and there is no relative movement between the side gears and case or between the differential pinions and the side gears. The case is rotated by engagement with the drive pinion 12 and the ring gear and drive pinion are lubricated by the lubricant of low viscosity contained in the differential housing 10. Thus, under normal driving conditions, there is no movement of the gears within the case which would tend to produce wear. When turning a corner, some differential movement between the driven shafts 31 and 32 is necessary. However, even when turning relatively sharp corners the differential between the driven shafts required to effect turning, is relatively low. The forces applied to the gears in the case by the highly viscous lubricant in the differential case which tend to impede movement of the parts in the case, are not very high at such low relative rotational speeds so that turning of the vehicle is not seriously impeded. Since, as previously described, these forces increase as the relative rotational speeds between the driven gears increase, a greater portion of the input torque is transmitted to the driven shaft which is either stationary or rotating at a lower speed than the other drive shaft. In this manner, free spinning of one of the vehicle drive wheels while the other remains stationary, as normally occurs when only one wheel has adequate traction, is prevented.

I claim:

1. A differential transmission for connecting a drive shaft to a pair of driven shafts comprising, a differential housing defining a housing chamber therein, a differential case rotatably mounted in said housing chamber, a pair of differential side gears axially spaced apart and rotatably mounted in said case and adapted for connection to said driven shafts, said case and side gears defining an enclosed case chamber sealed from said housing chamber, a plurality of differential pinions mounted in said case between said side gears and each meshing with said side gears, the space between said side gears being open to provide free communication between opposite sides of the differential pinions, a ring gear mounted on said case, a drive pinion mounted on said housing and meshing with said ring gear to rotate said case, a lubricating oil in said housing chamber for lubricating said drive gear and ring gear, a lubricant completely filling said differential case and having a viscosity which is high as compared to the viscosity of the lubricating oil in said housing chamber, said lubricant in said case being sufficiently viscous so that it does not flow freely into and out of the inter-tooth spaces on the differential pinions and side gears and thus impedes rotation therebetween sufficiently to transmit an appreciably greater torque from the drive pinion to which ever of the side gears rotates at the lower speed, and means for applying pressure on the lubricant in said differential case sufficient to cause the lubricant to flow rapidly into the inter-tooth spaces in said side gears and said differential pinion gears whereby to maintain the intertooth spaces in the gears filled with the highly viscous lubricant.

2. A differential transmission for connecting a drive shaft to a pair of driven shafts comprising a differential housing defining a housing chamber therein, a differential case rotatably mounted in said housing chamber and having opposed shaft openings therein, a pair of differential side gears extending into said shaft openings and rotatably supported on said case and adapted for connection to said driven shafts, said case and side gears defining an enclosed case chamber sealed from said housing chamber, said side gears having bearing surfaces on the outer face thereof engaging said case to form a running seal therewith, a plurality of differential pinions mounted in said case and each meshing with said side gears, a ring gear mounted on said case, a drive pinion mounted in said housing and meshing with said ring gear to rotate said case, a lubricating oil in said housing chamber for lubricating said drive gear and ring gear, a lubricant completely filling said differential case and having a viscosity high as compared to the viscosity of the lubricating oil in said housing chamber, said lubricant in case being sufficiently viscous so that it does not flow freely into and out of the inter-tooth spaces on the differential pinions and side gears whereby a portion of the lubricant is trapped in the inter-tooth spaces as the side gears and pinions rotate relative to each other and produces a separating force between the pinions and side gears urging the bearing faces on the latter against the case to thereby impede relative rotation between the side gears and the case, an expansible chamber communicating with said case chamber and adapted to receive lubricant therefrom when the case chamber is filled, and means for yieldably urging the lubricant from said expansible chamber into said case chamber to maintain the latter completely filled with lubricant under pressure sufficient to pressure load said side gears outwardly and urge said bearing surfaces on the outer faces thereof against the case for maintaining a seal therebetween and to force the lubricant in said differential case into the inter-tooth spaces in said side gears and said differential pinion gears.

3. A differential transmission for connecting a drive shaft to a pair of driven shafts comprising, a diffential housing defining a housing chamber therein, a differential case rotatably mounted in said housing and having opposed shaft openings therein, a pair of beveled differential side gears extending into said shaft openings and rotatably supported on said case and adapted for connection to said driven shafts, said case and side gears defining an enclosed case chamber sealed from said housing chamber, said side gears having a bearing face on the side thereof opposite the gear teeth thereon adapted to abut against said case to form a running seal therewith, a plurality of beveled differential pinion gears mounted in said case and each meshing with said side gears, said side gears being axially spaced apart and defining an open passage therebetween communicating with the differential pinions on opposite sides thereof, a ring gear mounted on said case, a drive pinion mounted on said housing and meshing with said ring gear to rotate said case, a quantity of lubricating oil in said differential chamber for lubricating said drive pinion and ring gear, a lubricant completely filling said case and having a viscosity which is high as compared to said lubricating oil in said housing chamber, said lubricant in said case being sufficiently viscous so that it does not flow freely into and out of the inter-tooth spaces on the differential pinion gears and side gears to thereby impede rotation therebetween and transmit a greater torque from the drive pinion to which ever of the side gears rotates at the lower speed, and an expansible chamber communicating with said case chamber and projecting into the space between said side gears and in spaced relation thereto, said expansible chamber being adapted to receive lubricant from the case chamber when the case chamber is filled, and means for yieldably urging the lubricant from said expansible chamber into said case chamber to maintain the latter completely filled with lubricant under pressure sufficient to pressure load said side gears outwardly and urge said bearing faces thereon against the case to provide a seal thereat and prevent passage of lubricant thereby and to force the lubricant in said case into the inter-tooth spaces in said side gears and said differential pinion gears.

References Cited in the file of this patent

UNITED STATES PATENTS

| | | |
|---|---|---|
| 1,431,572 | Dodge | Oct. 10, 1922 |
| 1,663,647 | Brush | Mar. 27, 1928 |
| 2,267,362 | Ash | Dec. 23, 1941 |
| 2,353,692 | Cunningham | July 18, 1944 |
| 2,463,091 | Dortort | Mar. 1, 1949 |
| 2,489,859 | Butterworth | Nov. 29, 1949 |